United States Patent
Cilliere et al.

(10) Patent No.: US 6,561,585 B2
(45) Date of Patent: May 13, 2003

(54) HINGE MECHANISM FOR A VEHICLE SEAT, AND A SEAT FITTED WITH SUCH A MECHANISM

(75) Inventors: François Cilliere, La Selle la Forge (FR); Yann Reubeuze, Landigou (FR)

(73) Assignee: Faurecia, Boulogne (FR)

( * ) Notice: Subject to any disclaimer, the term of this patent is extended or adjusted under 35 U.S.C. 154(b) by 0 days.

(21) Appl. No.: 09/818,169

(22) Filed: Mar. 27, 2001

(65) Prior Publication Data

US 2002/0017811 A1 Feb. 14, 2002

(30) Foreign Application Priority Data

Mar. 30, 2000 (FR) .............................. 00 04056
Oct. 19, 2000 (FR) .............................. 00 13413

(51) Int. Cl.⁷ .............................................. B60N 2/02
(52) U.S. Cl. ...................................................... 297/367
(58) Field of Search ........................................ 297/367

(56) References Cited

U.S. PATENT DOCUMENTS

| 4,143,905 A | * | 3/1979 | Hensel et al. ............ 296/65.17 |
| 4,770,464 A | | 9/1988 | Pipon et al. |
| 5,216,936 A | * | 6/1993 | Baloche ..................... 74/527 |
| 5,681,086 A | | 10/1997 | Baloche |
| 5,755,491 A | | 5/1998 | Baloche et al. |
| 5,769,494 A | * | 6/1998 | Barrere et al. ............... 297/367 |
| 5,788,325 A | | 8/1998 | Ganot |
| 5,813,724 A | * | 9/1998 | Matsuura et al. ............ 297/367 |
| 5,881,854 A | * | 3/1999 | Rougnon-Glasson ........ 192/15 |
| 6,007,153 A | * | 12/1999 | Benoit et al. .......... 297/378.12 |
| 6,325,458 B1 | * | 12/2001 | Rohee et al. ............... 297/367 |
| 6,328,383 B2 | * | 12/2001 | Rohee et al. ............... 297/367 |

FOREIGN PATENT DOCUMENTS

| EP | 0 720 930 | 7/1996 |
| EP | 0 741 056 | 11/1996 |
| FR | 2205132 | 5/1974 |

OTHER PUBLICATIONS

Search Report issued by the French Patent Office for parent French Application No. 00 04056 filed on Mar. 30, 2000; report dated Dec. 15, 2000.
Search Report issued by the French Patent Office for parent French Application No. 00 13413 filed on Oct. 19, 2000; report dated Dec. 31, 2001.

* cited by examiner

Primary Examiner—Peter M. Cuomo
Assistant Examiner—Joseph Edell
(74) Attorney, Agent, or Firm—Marshall, Gerstein & Borun (57) ABSTRACT

A hinge mechanism comprises a moving cheek-plate having a circular set of teeth and a stationary cheek-plate carrying first and second toothed slugs that slide radially in order to engage the set of teeth. The first slug normally slides without circumferential clearance over the stationary cheek-plate while the second slug slides with clearance between two guides that diverge towards the set of teeth so as to co-operate with them to form two wedge-shaped spaces that receive two wedges projecting from either side of the second slug.

17 Claims, 9 Drawing Sheets

HINGE MECHANISM FOR A VEHICLE SEAT, AND A SEAT FITTED WITH SUCH A MECHANISM

FIELD OF THE INVENTION

The present invention relates to hinge mechanisms for vehicle seats and to seats fitted with such mechanisms.

More particularly, the invention relates to a vehicle seat hinge mechanism comprising:

- first and second rigid structures mounted to pivot relative to each other about a pivot axis;
- a set of teeth secured to the first structure and forming at least a circular arc centered on the pivot axis;
- at least one toothed locking member mounted on the second structure with substantially no play in a circumferential direction so long as the hinge mechanism is not subjected to a torque in excess of a certain normal value, the locking member being movable in a substantially radial direction between firstly an active position in which said locking member engages the teeth of the first structure to prevent the first and second structures moving relative to each other, and secondly a retracted position in which said locking member does not interfere with the teeth of the first structure (for example, the locking member can slide in the radial direction, or where appropriate it can pivot about an axis situated at the end of a lever arm, in which case the toothed portion of the locking member can follow a curved trajectory tangential to the radial direction); and
- a control device suitable for selectively placing the locking member either in its active position or else in its retracted position.

BACKGROUND OF THE INVENTION

Document EP-A-0 720 930 describes an example of such a hinge mechanism, which gives entire satisfaction. Nevertheless, given progress in safety standards which are becoming ever more severe, it can be useful in some cases to further increase the strength of hinge mechanisms of the above-mentioned type in order to avoid, as much as possible, any breakage of such mechanisms in the event of an accident, with said hinge mechanisms then being subjected to rotary torques that are particularly high.

OBJECTS AND SUMMARY OF THE INVENTION

For this purpose, according to the invention:

- the mechanism further comprises at least one blocking member having teeth adapted to engage with the teeth of the first structure, said blocking member being mounted on the second structure in such a manner that its teeth leave a certain amount of clearance in the circumferential direction, the blocking member being movable between firstly an active position in which said blocking member engages the teeth of the first structure, and secondly a retracted position in which said blocking member does not interfere with the teeth of the first structure;
- the control device is adapted simultaneously to place the blocking member and the locking member either in the active position or else in the retracted position; and
- the second structure has a least one guide which is normally separated from the blocking member by said circumferential clearance, the guide being adapted to co-operate with a projecting side bearing edge belonging to the blocking member to press said blocking member by the wedge effect against the teeth of the first structure when the hinge mechanism is subjected to a torque which greater than said normal value and which absorbs said circumferential clearance of the blocking member by moving the blocking member towards its guide.

By means of these dispositions, locking of the hinge mechanism is reinforced by the blocking member in the event of said mechanism being subjected to a high rotary torque. In addition, the circumferential clearance of the blocking member relative to the second structure makes it possible not only to move the blocking member towards its retracted position under normal circumstances in spite of the projecting bearing edge of the blocking member, but also to guarantee that the blocking member is properly engaged with the teeth of the first structure so long as said blocking member is not in its retracted position.

In preferred embodiments of the invention, use may optionally be made of one or more of the following dispositions:

- the second structure has two guides on either side of the blocking member and normally separated from the blocking member by said circumferential clearance, said guides being adapted to co-operate respectively with the two bearing edges belonging to the blocking member by pressing the blocking member by the wedge effect against the teeth of the first structure when the hinge mechanism is subjected to a torque that is greater than said normal value and that absorbs said circumferential clearance of the blocking member;
- the blocking member is mounted to slide in a substantially radial direction between its two guides, the guides having respective bearing zones substantially in point contact with the locking member, leaving said locking member with a certain amount of angular clearance, which angular clearance corresponds to said circumferential clearance of the teeth of the blocking member;
- the bearing edge of the blocking member co-operates with the teeth of said blocking member to form a wedge that projects sideways relative to said blocking member;
- the guide of the blocking member co-operates with the teeth of the first structure to define a wedge-shaped space which opens towards the corresponding bearing edge of the blocking member;
- the control device comprises:
  - a rotary cam which is urged resiliently towards a rest position in which said cam places the locking member in its active position; and
  - at least one control plate which is secured to the cam and which overlies the locking member and the blocking member at least in part, said control plate having cutouts adapted to co-operate with projecting pegs formed on the locking member and on the blocking member so as to displace said locking member and said blocking member simultaneously towards their retracted positions when the cam is moved into an actuation position;
- the blocking member is urged towards its active position by a spring connecting said blocking member to the second structure;
- the cutout of the control plate has a ramp-shaped camming edge which is adapted to hold the blocking member in its active position when the cam is in its actuation position;

the control device comprises:
  a rotary cam which is urged resiliently towards a rest position in which said cam places the locking member in its active position; and
  at least one control plate which is secured to the cam and which overlies the locking member and the blocking member at least in part, said control plate having a cutout adapted to co-operate with a projecting peg provided on the locking member so as to move said locking member towards its retracted position when the cam is moved into an actuation position, said control plate also having a camming edge adapted to co-operate with a projecting peg provided on the blocking member so as to move said blocking member into its active position when the cam is moved into its actuation position, the blocking member being urged resiliently towards its retracted position;
the blocking member is urged resiliently towards its retraced position by a resilient member which bears against the teeth of the first structure;
the resilient member comprises a bearing plate in the form of a circular sector which bears against the teeth of the first structure, and at least one resilient tab secured to the bearing plate and engaged in a hole formed in the blocking member;
the resilient member is a spring wire having at least one circularly-arcuate outer segment bearing against the teeth of the first structure, said circularly-arcuate segment being extended by at least one branch folded as a hairpin and terminated by an end which is engaged in a recess in the blocking member;
the resilient member has two circularly-arcuate segments interconnected by a V-shaped reentrant portion, each of the circularly-arcuate segments being extended by a respective branch folded as a hairpin and terminated by turns wound about an axis parallel to the pivot axis and engaged in a recess formed in the blocking member, at least one of the windings being engaged with clearance in the corresponding recess;
the hinge mechanism comprises:
  two diametrically-opposite locking members; and
  two blocking members that are likewise diametrically-opposite and that are disposed substantially at right angles relative to the two locking members;
a blocking member and two locking members disposed symmetrically relative to the blocking member, the blocking member forming an angle relative to each locking member where said angle lies in the range 100° to 170° about the pivot axis;
the control device comprises a rotary cam which is resiliently urged towards a rest position in which said cam holds the locking members in the active position, the cam having first, second, and third bearing edges projecting radially outwards and distributed around he pivot axis, the first and second bearing edges of the cam being adapted to bear against the locking members when the cam is in the rest position, and the third bearing edge of the cam being disposed symmetrically relative to the first and second bearing edges and being adapted to bear radially against an abutment secured to the second structure when the cam is in the rest position, said abutment limiting the movement of the blocking member.

The invention also provides a vehicle seat having a seat proper and a seat-back that are interconnected by at least hinge mechanism as defined above.

BRIEF DESCRIPTION OF THE DRAWINGS

Other characteristics and advantages of the invention will appear on reading the following description of various embodiments given as non-limiting examples with reference to the accompanying drawings. In the drawings.

MORE DETAILED DESCRIPTION

In the various figures, the same references designate elements which are identical or similar.

Figure 1:
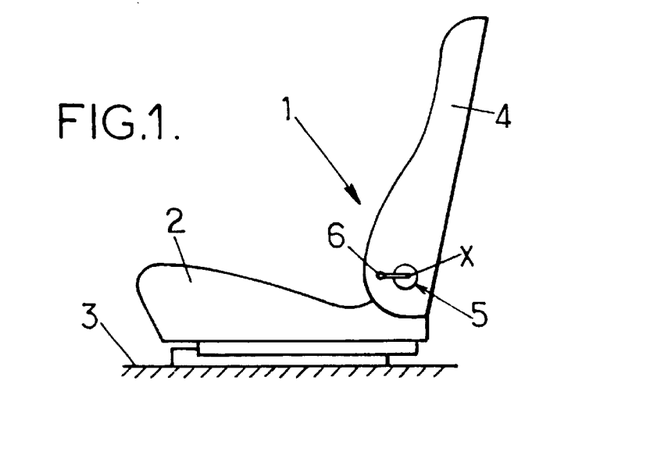
FIG. 1 is a diagrammatic view of a vehicle seat including a hinge mechanism constituting a first embodiment of the invention.

As shown diagrammatically in FIG. 1, the invention relates to a vehicle seat 1, an particular a motor vehicle front seat, comprising:
  firstly a seat proper 2 mounted on the floor 3 of the vehicle; and
  secondly a seat-back 4 pivotally mounted on the seat proper about a transverse horizontal axis X by means of at least one hinge mechanism 5 controlled by a control lever 6 or the like.

Figure 2:
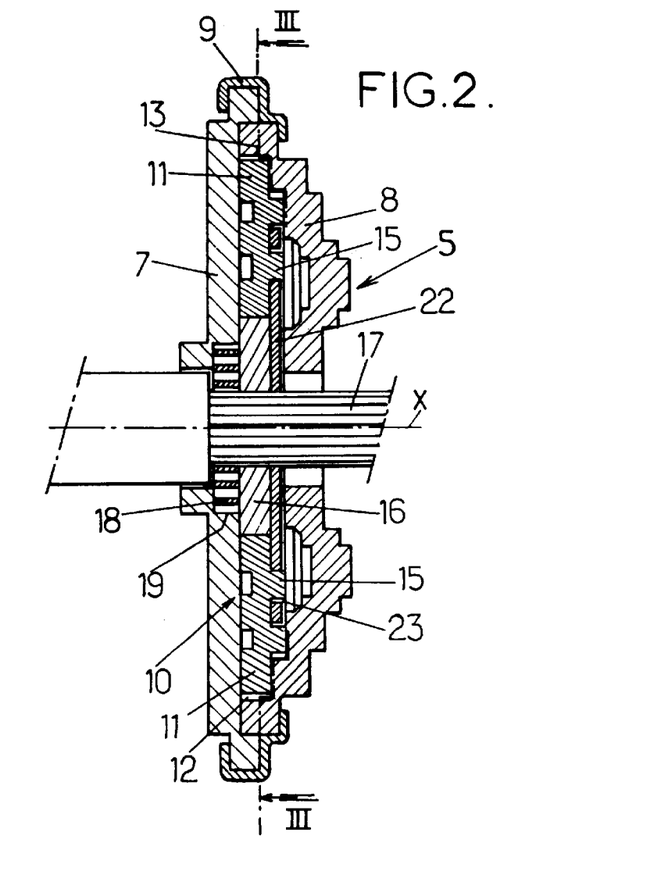
FIG. 2 is an axial section view of a hinge mechanism fitted to the FIG. 1 seat, shown with the mechanism in the rest position.
Figure 3:
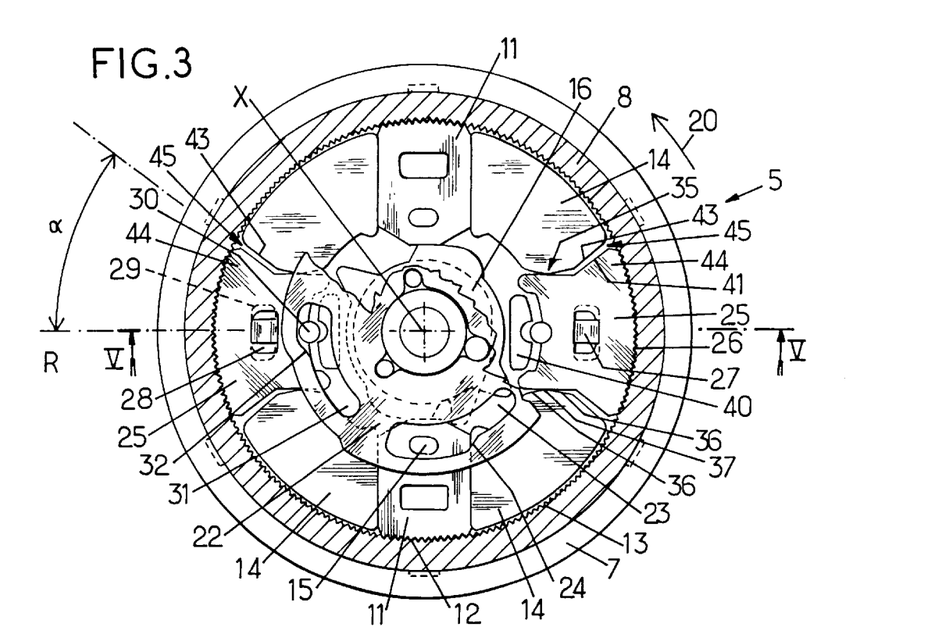
FIG. 3 is a section view on discontinuous line III—III in FIG. 2.

As shown in FIGS. 2 and 3, the range mechanism 5 comprises:
  a metal cheek-plate 7 which in this case is stationary and secured to the rigid structure of the seat proper 2.

a metal cheek-plate 8 which in this case is moving and secured to the structure of the seat-back 4;

a metal ring 9 which is crimped to the periphery of the stationary and moving cheek-plates and which co-operates therewith to define a closed circular case; and a locking device 10 which is contained in said case and which is adapted to prevent the moving cheek-plate 8 from moving relative to the stationary cheek-plate 7 unless the lever 6 is actuated.

By way of example, the locking device 10 can have two diametrically-opposite first locking members or metal slugs 11 each having outwardly-directed teeth 12 adapted to engage in a circular set of inwardly-directed teeth 13 formed in the moving cheek-plate 8 and centered on the axis X.

Each of these slugs is mounted to slide radially in a channel defined between two rigid guides 14 belonging to the cheek-plate 7 disposed on either side of the slug 11 with substantially no clearance in the circumferential direction.

The slugs 11 are thus displaceable between:

firstly a locking position in which the teeth 12 on the slugs engage with the teeth 13 of the moving cheek-plate so as to lock the hinge mechanism; and secondly a retracted position in which the slugs do not co-operate with the teeth of the moving cheek-plate.

Each slug also has at least one peg 15 that projects axially towards the moving cheek-plate 8.

The locking device 10 includes a control device comprising a metal cam 16 which is secured to a control shaft 17 itself secured to the lever 6, the cam controlling sliding of the slugs 11.

In addition, a spring 18 is mounted, for example in a cup 19 stamped in the stationary cheek-plate 7, in order to urge the control shaft 17 and the cam 16 in angular direction 20 towards a rest position in which said cam places the slugs 11 in their locking position, said cam being capable of pivoting in the opposite angular direction 21 under drive from the control lever 6, thereby enabling the slugs to slide towards their retracted position, thereby releasing the hinge mechanism.

Figure 6:
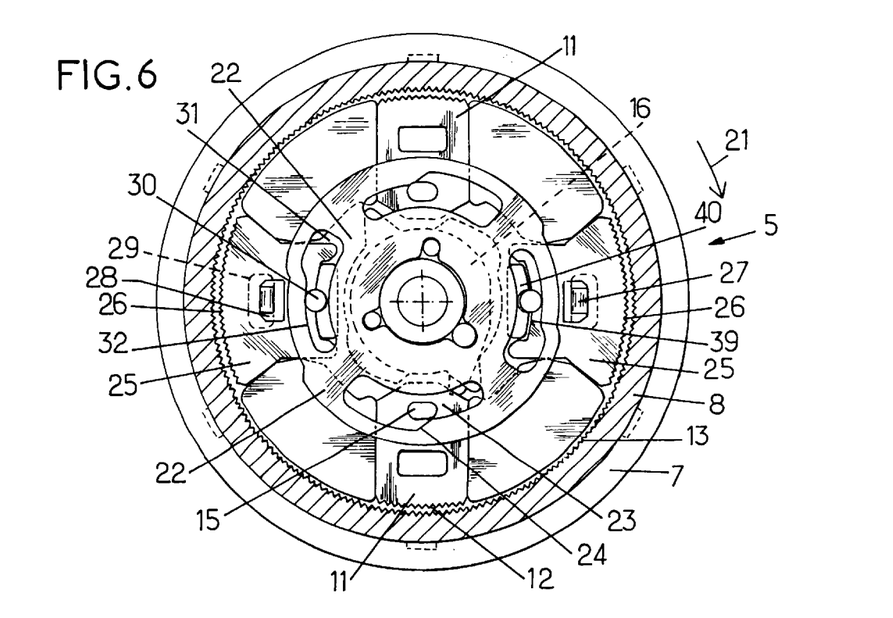
FIGS. 6 and 7 are views similar to FIG. 3 showing the hinge mechanism respectively in its actuation position and in the event of a high rotary torque being applied to the seat-back.

In addition, a rigid metal plate 22 lying in a radial plane is constrained to rotate with the cam 16 and extends between said cam and the moving cheek-plate 8, covering the slugs 11 in part. This plate has two cutouts 23 which receive the pegs 15 of the slugs, each of the pegs co-operating with a camming edge 24 defining the corresponding cutout radially outwards and shaped to move the corresponding slug radially inwards when the cam 16 turns in the direction 21 (FIG. 6).

The control device 10 also has two additional blocking members or metal slugs 25 (FIGS. 3 to 5) which are diametrically-opposite about the axis X and disposed at 90° relative to the slugs 11.

Each of the slugs 25 has outwardly-directed teeth 26 adapted to engage with the inwardly-directed teeth 13 of the moving cheek-plate 8.

In addition, each of the slugs 25 is mounted to slide radially along a direction R in a guide formed by two adjacent abutment members 14 so that said slug 25 is movable between:

firstly an active position in which the teeth 26 of the slug engage the teeth 13 of he moving cheek-plate; and secondly a retracted position in which the slug 25 does not co-operate with the teeth 13 of the moving cheek-plate.

Figure 4:
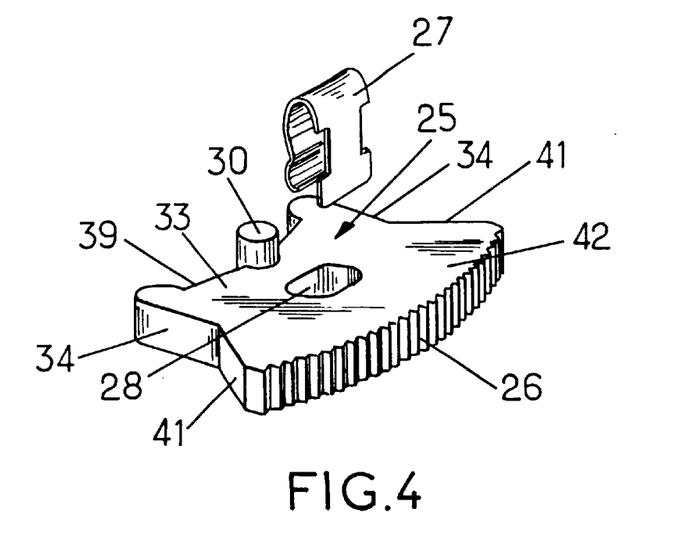
FIG. 4 is an exploded perspective view showing one of the blocking members of the FIG. 3 hinge mechanism together with its spring.
Figure 5:
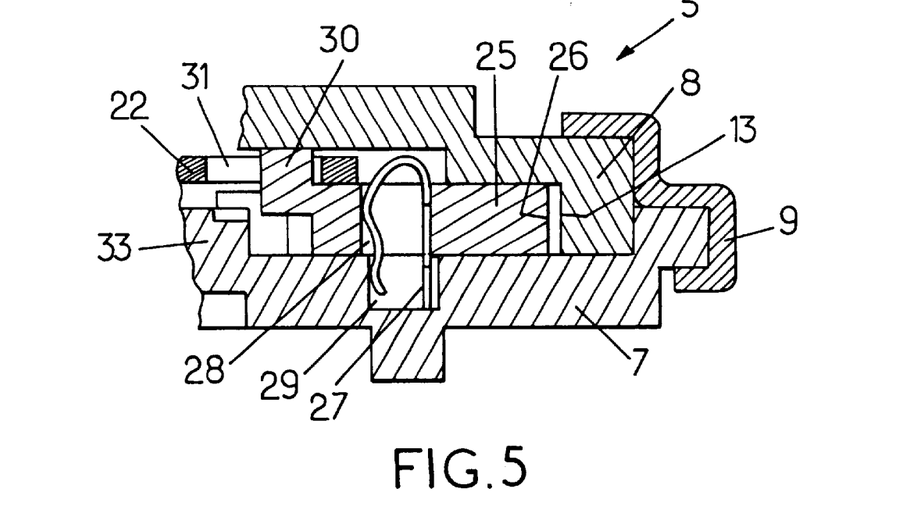
FIG. 5 is a detail view in section on line V—V of FIG. 3.

Each slug 25 is urged resiliently towards its active position, e.g. by means of a spring 27 such as a spring blade folded substantially into a U-shape, passing through a hole 28 formed through the slug 25 and penetrating into a recess 29 formed in the stationary cheek-plate 7 (FIGS. 4 and 5).

In addition, the slug 25 has a peg 30 which projects axially towards the moving cheek-plate 8 and which penetrates into a cutout 31 formed in the plate 22.

This cutout 31 has a camming edge 32 which co-operates with the peg 30 of the corresponding slug 25 to move said slug into its retracted position simultaneously with the above-mentioned slugs 11 (FIG. 6).

Furthermore, as can be seen in FIGS. 3 and 4, each slug 25 has a rear portion 33 provided with two side edges 34 extending parallel to the radial direction of symmetry R of the slug 25, these side edges 34 being in mutual contact with corresponding edges 35 belonging to the two adjacent guides 14. Each of the edges 35 preferably forms two plane faces 36 forming a dihedral angle that is close to about 170°, for example, so as to converge towards a point 37 in contact with the slug 25.

By means of these dispositions, each slug 25 is free to pivot a little about an axis parallel to the axis X, such that the teeth 26 of the slug can move with a small amount of play in the circumferential direction relative to the stationary cheek-plate 7.

This angular displacement is limited:

by the plane faces 36 of each edge 35 coming into abutment against the corresponding side edge 34;

by co-operation between a setback 39 formed at the rear end of the slug 25 and an abutment 40 of the stationary cheek-plate 7 which is continuously engaged at least in part in the setback 39; and by the side bearing edges 41 of the enlarged head 42 of the slug 25, which bearing edges diverge radially outwards (each forming an angle $\alpha$ relative to the direction R, where $\alpha$ lies in the range 30° to 60°, for example) and are obtained with a certain amount of clearance by two guide ramps 43 belonging to the two guides 14 adjacent to the slug 25.

The bearing edges 41 co-operate with the teeth 26 of the slug 25 to form wedges 44 projecting sideways relative to the slug, each of these wedges 44 being engaged in a wedge-shaped empty space 45 defined between the corresponding guide ramp 43 and the teeth 13 of the moving cheek-plate.

While the hinge mechanism is in normal use, the slugs 25 produce substantially no effect.

Figure 7:
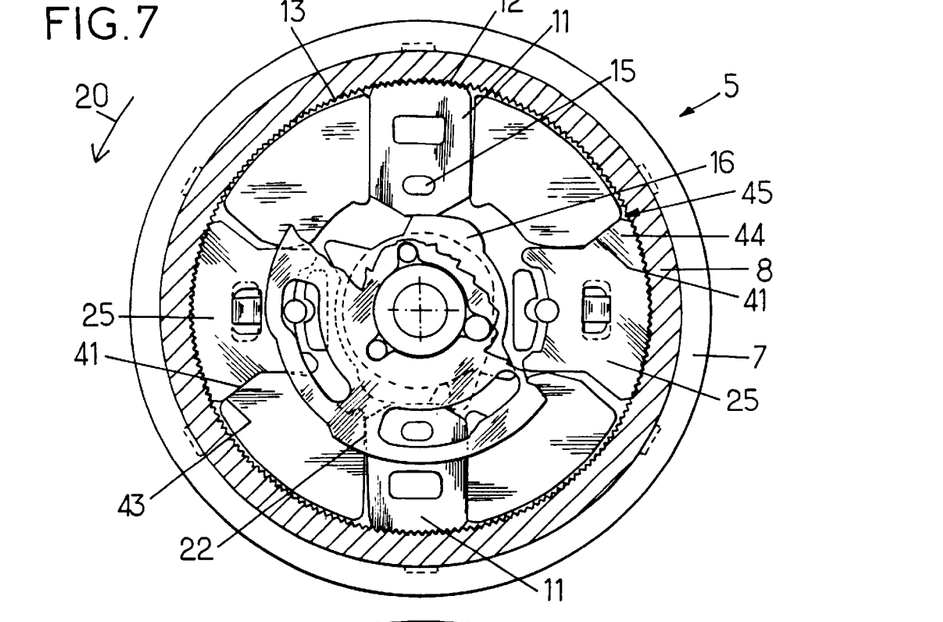

In contrast, when the seat-back is subjected to a particularly large pivoting torque (e.g. greater than 100 decaNewton meters (m.daN)), in particular as a result of the vehicle being involved in an accident, the locking slugs 11 can deform the guides 14 slightly such that the moving cheek-plate 8 begins to pivot in the angular direction 20 relative to the stationary cheek-plate 7, e.g. over an angle of less than 2°, as shown in FIG. 7.

Under such circumstances, one of the wedges 44 of each blocking slug 25 then absorbs the small amount of circumferential clearance that initially separated it from the corresponding guide ramp 43 such that each slug 25 is then pressed strongly against the teeth 13 of the moving cheek-plate by the wedging effect, thereby considerably reinforcing the mechanical strength of the hinge mechanism.

Figure 8:
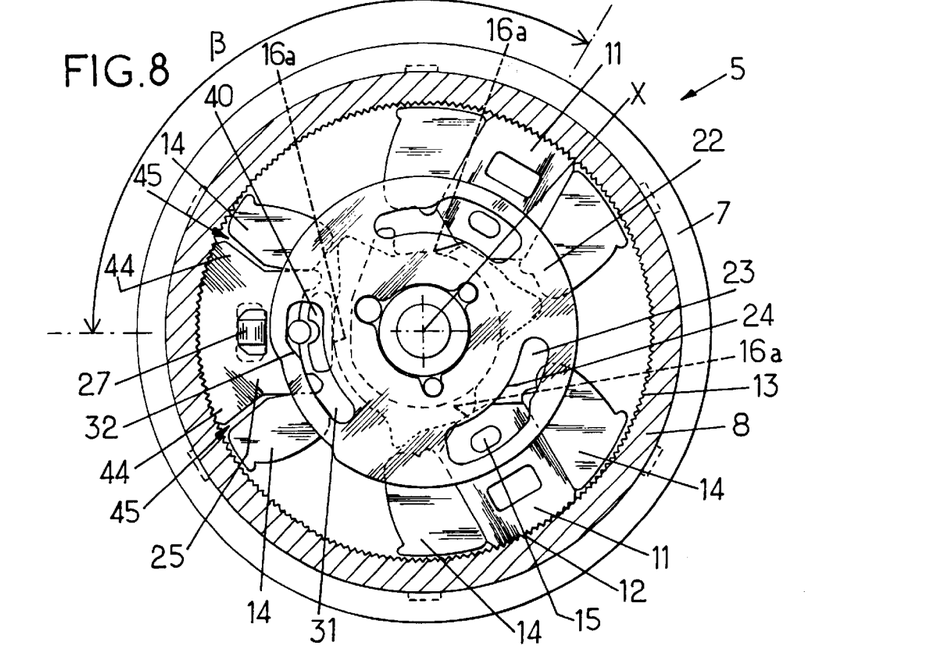
FIG. 8 is a view similar to FIG. 3 showing a second embodiment of the invention.

The variant shown in FIG. 8 operates in the same manner as the embodiment of FIGS. 2 to 7, such that this variant is not described in detail below.

This variant differs from the embodiment of FIGS. 2 to 7 merely by the following points:

the locking slugs 11 are disposed at 120° to each other about the pivot axis X;

- the hinge mechanism has only one blocking slug 25 which is disposed at 120° to the two locking slugs 11.
- the cam 16 has three bearing edges 16a which are disposed at 120° to one another about the axis X and which bear respectively against the rear ends of the two slugs 11 and against the rear abutment 40 of the slug 25 when the cam 16 is in the rest position, thus balancing the forces to which said cam is subjected without stressing the shaft 17 excessively; and
- the guides 14 of the slugs 11 are distinct from the guides 14 of the slug 25.

Naturally, other variants are possible, in particular variants in which:

- the number of locking slugs 11 is other than two, but not zero;
- the number of blocking slugs 25 is greater than two;
- the slugs 11 are not slidably mounted but, where appropriate, can pivot at the ends of respective lever arms;
- the control device for controlling the slugs 11 and 25 is different from the control device described above which comprises the cam 16, the spring 18, the control plate 22, and the springs 27;
- the slugs 25 are connected to the stationary cheek-plate 7 via a link other than a sliding link: for example, the slugs 25 could be pivotally mounted on the cheek-plate 7, each at the end of a respective lever arm: for example, each of the slugs 25 could be placed at the end of a lever arm mounted to pivot with clearance on the stationary cheek-plate 7;
- each slug 25 can have a single wedge 44 co-operating with a single guide ramp 43 so as to block the hinge mechanism 5 when it is subjected to a nigh rotary torque in one angular direction only, e.g. corresponding to the direction in which the hinge mechanism is stressed when the vehicle is subjected to a rear impact; and/or
- the enlarged heads 42 of the slugs 25 and the corresponding portions of the guides 14 can be of shapes different from those described above, providing the shapes are suitable for co-operating mutually to press the slugs 25 against the teeth 13 by the wedging effect in the event of a high rotary torque being applied.

Figure 9:
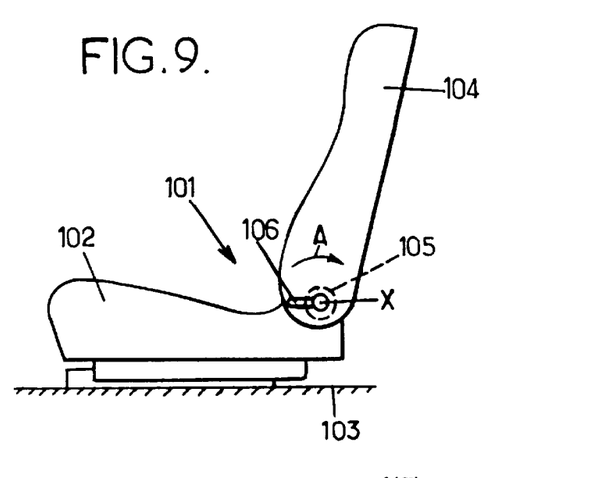
FIG. 9 is a diagrammatic view of a seat having a back with inclination that is adjustable by means of a hinge mechanism constituting a third embodiment of the invention.

In the third embodiment of the invention, as shown diagrammatically in FIG. 9, the invention still relates to a vehicle seat 101, in particular a motor vehicle front seat, comprising firstly a seat proper 102 mounted on the floor 103 of the vehicle, and secondly a seat-back 104 pivotally mounted on the seat proper 102 about a transverse horizontal axis X.

As before, the rigid structure of the seat-back is connected to the rigid structure of the seat proper by a hinge mechanism 105 controlled by a handle 106 that is mounted to pivot about a transverse horizontal axis X. The structure of the seat-back can optionally be connected to the seat proper via two identical or similar hinge mechanisms 105 disposed on either side of the seat and both controlled by said handle 106.

When the handle 106 is actuated in the angular direction A shown in FIG. 9, it serves to release the hinge mechanism 105 so as to enable the user to adjust the inclination of the seat-back 104 by acting directly on the seat-back, said seat-back generally being urged forwards by at least one spring (not shown).

Figure 10:
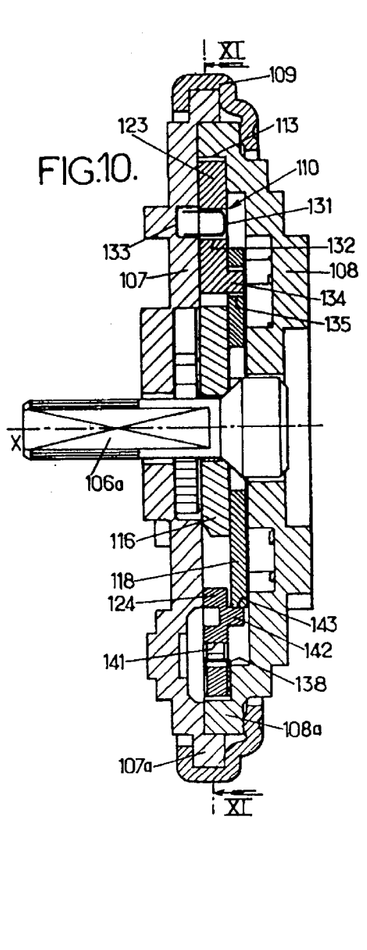
FIGS. 10 and 11 are section views through the hinge mechanism fitted to the FIG. 9 seat, the sections showing the hinge mechanism in the rest position and being taken respectively on line X—X of FIG. 11 and line XI—XI of FIG. 10 (the slugs and the cam of the hinge mechanism are not shown in section for greater clarity, and the control plate of the mechanism which is situated above the section plane is represented by dashed lines)
Figure 11:
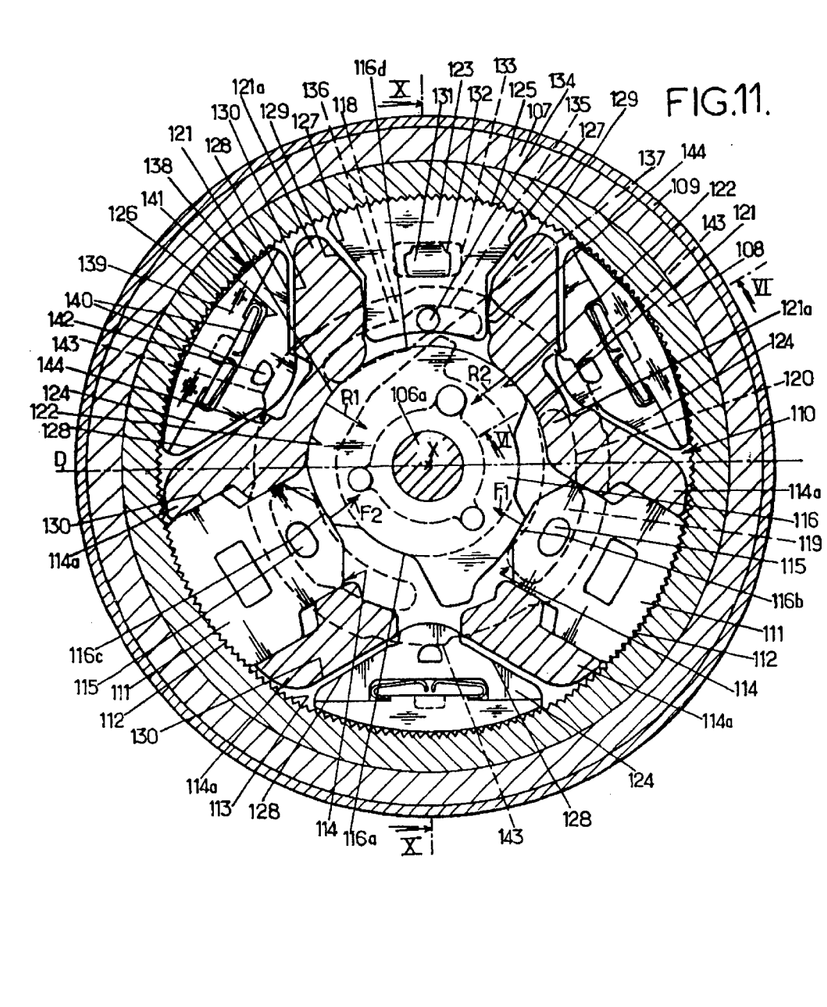

As shown in FIGS. 10 and 11, the hinge mechanism 105 comprises:

- a stationary metal cheek-plate 107 extending perpendicularly to the axis X and suitable for being secured to the rigid structure of the seat proper, for example;
- a moving metal cheek-plate 108 which likewise extends perpendicularly to the axis X and which can be secured to the structure of the seat-back, for example, the cheek-plate 108 having an outer ring 108a which is surrounded by an outer ring 107a belonging to the cheek-plate 107;
- a metal ring 109 which is crimped around the periphery of the stationary and moving cheek-plates 107 and 108 to co-operate therewith to define a closed circular case; and
- a locking device 110 having slugs that is contained inside said case and that is adapted to prevent the moving cheek-plate 108 moving relative to the stationary cheek-plate 107 so long as the handle 106 is in the rest position.

Figure 12:
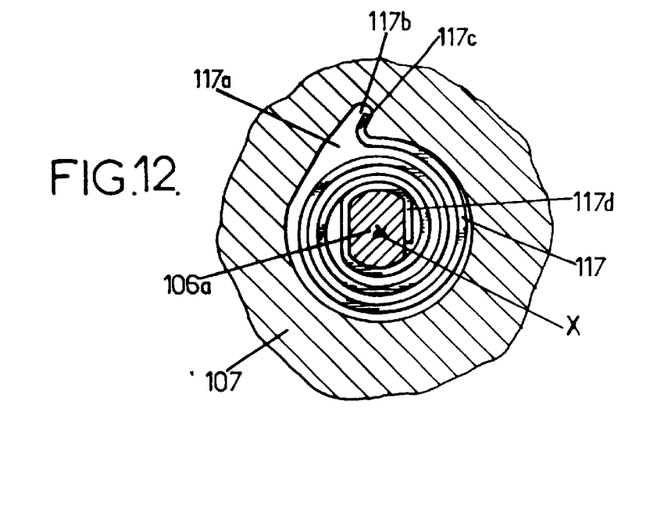
FIGS. 12 and 13 are detail views respectively showing the central spring and the control tab of the mechanism of FIGS. 10 and 11.
Figure 13:
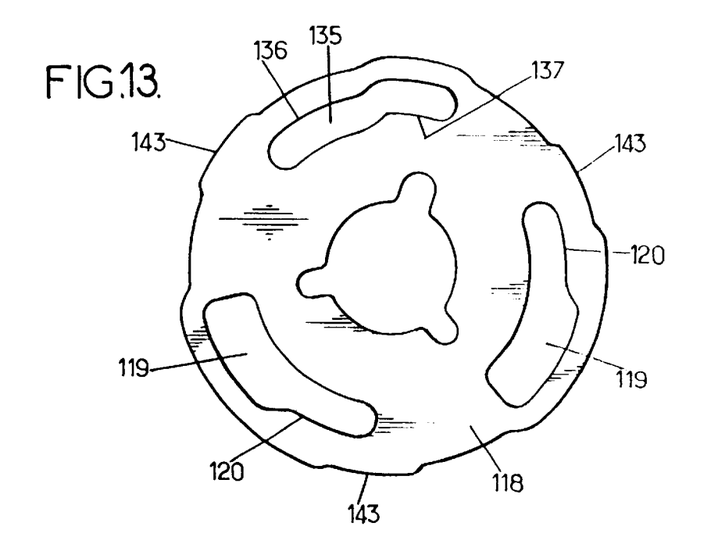

The locking device 110 comprises:

- two metal locking slugs 111 disposed at 120° to each other about the axis X and each presenting outwardly-directed teeth 112 adapted to engage with a circular set of inwardly-directed teeth 113 formed in the moving cheek-plate 108, each of the slugs being mounted to slide radially in a guide 114 which is secured to the stationary cheek-plate 107 (by way of example, the guide 114 can be formed by two half-cutouts or stampings 114a formed in the stationary cheek-plate), so that the locking slugs can be moved between firstly an engagement position in which the teeth 112 on the slugs engage with the teeth 113 of the moving cheek-plate to block the hinge mechanism 105, and secondly a retracted position in which the slugs 111 do not co-operate with the teeth 113 of the moving cheek-plate, each slug also having at least one rear peg 115 which projects axially towards the moving cheek-plate 108;
- a metal cam 116 which is secured to the handle 106 via a control shaft 106a, said cam possessing a peripheral edge 116a having two projecting camming edges 116b and 116c adapted to bear against the rear ends of the locking slugs 111, the camming edge 116c being extended angularly away from the locking slugs 111 by respective circularly-arcuate sectors 116d of constant radius;
- a spiral spring 117 (see FIG. 12) mounted in a housing 117a stamped in the stationary cheek-plate 107 and urging the cam 116 towards a rest position in which the camming edges 116b and 116c place the slugs 111 in the engagement position, said cam being capable of pivoting in the angular direction A under drive from the handle 106 into an actuation angular position while enabling the slugs 111 to slide towards the retracted position, thereby releasing the hinge mechanism 105 (advantageously, the housing 117a that receives the spring 117 can include a notch 117b which secures the folded end 117c of the spiral spring 117, while the other end 117d of the spiral spring is clamped around a portion of the control shaft 106a which has two side flats); and
- a rigid metal control plate 118 (see FIGS. 11 and 13) which is stationary by interfitting with the cam 116 and which extends in the radial direction between said cam and the moving cheek-plate 108, overlying the slugs 111 in part, said control plate having two cutouts 119 in which the pegs 115 of the locking slugs are engaged, each of these pegs co-operating with a ramp-shaped camming edge 120 defining the radially outer side of the corresponding cutout 119 and shaped so as to move the corresponding slug radially inwards when the cam 116 turns in the angular direction A.

In order to increase the mechanical strength of the hinge 105 against the rotary torques that might be applied to it, in particular when the vehicle in which the seat is installed is subjected to an accident, the stationary cheek-plate 107 also has two abutment zones 121 (see FIG. 11) which are preferably formed by two semi-cutouts or stampings 121a formed in said cheek-plate.

These abutment zones 121 are advantageously in the form of circularly-arcuate edges centered on the axis X, having the same radius as the circular sector 116d of the cam, which circular sector 116d is in sliding contact with said abutment zones 121.

The two abutment zones 121 face radially towards the axis X and they are both disposed on the same side of a common diametral line D, the locking slugs 111 being disposed opposite the abutment zones 121 about said diametral line such that each abutment zone 121 faces towards the rear end of one of the locking slugs 111.

Thus, when a torque is applied between the stationary and moving cheek-plates 107 and 108 of the hinge mechanism, the reversing forces F1 and F2 of the two locking slugs 111 are absorbed by the cam 116 and compensated by reactions R1 and R2 exerted by the abutment zones 121 on the corresponding portions 122 of the circular sector 116d of the cam. Given the disposition of the abutment zones 121 as a V-shape that is open towards the two slugs 111, the cam 116 is in a position of stable equilibrium under the effect of the various forces F1, F2, R1, R2, thereby further improving the mechanical strength of the assembly and guaranteeing that the locking slugs 111 will not reverse even when very high torques are applied between the two cheek-plates 107 and 108.

In addition, the control device 110 also has four additional rigid metal slugs 123 and 124 which are referred to as blocking slugs (see FIGS. 10 and 11). One of the blocking slugs 124 is placed between the two locking slugs 111 on one side of the above-mentioned diametral line D, while the other two blocking slugs 124 and the blocking slug 123 are all placed on the other side of said diametral line D, the blocking slug 123 being placed between the other two blocking slugs 124.

Figure 16:
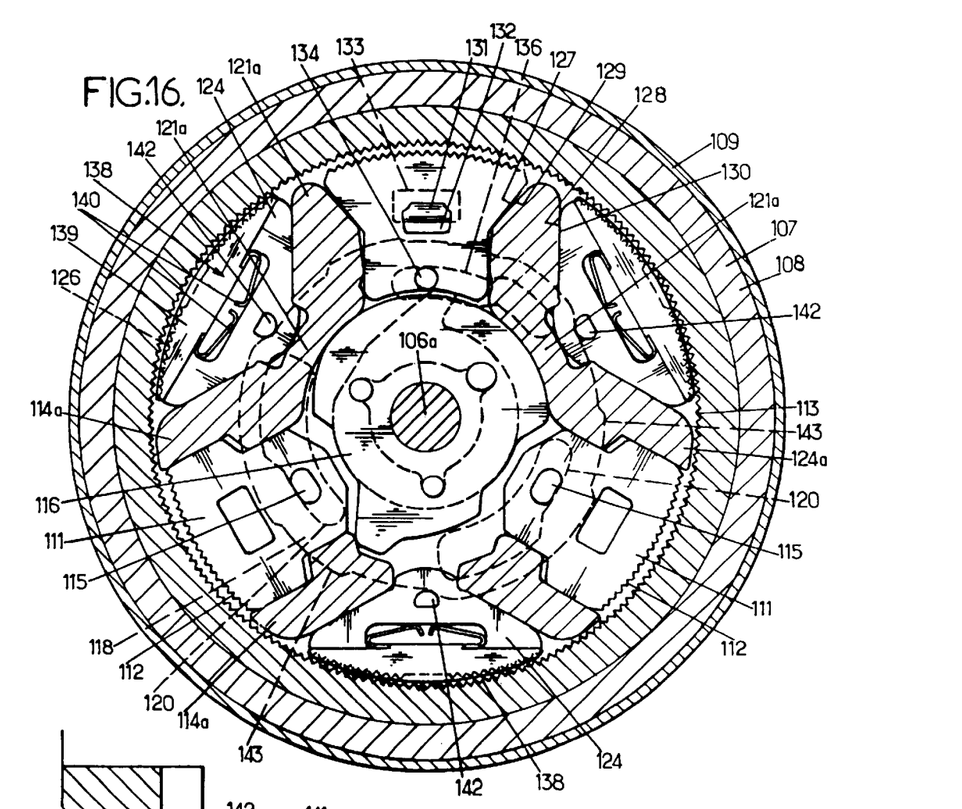
FIGS. 16 and 17 are similar respectively to FIGS. 11 and 14 and show the hinge mechanism in the actuation position.
Figure 17:
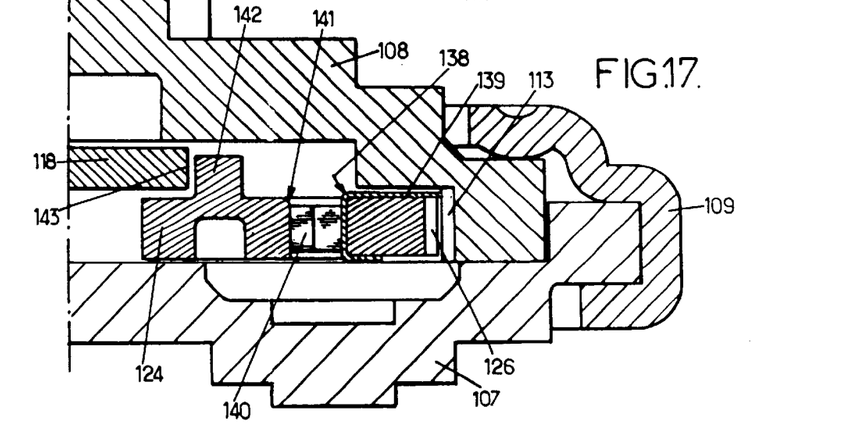

Each of the blocking slugs 123, 124 has teeth 125, 126 directed radially outwards and adapted to engage with the inwardly-directed teeth 113 of the moving cheek-plate 108. In addition, each of the slugs 123, 124 is mounted to slide radially in a guide that is secured to the stationary cheek-plate 107 so that said blocking slugs 123, 124 can be moved between:

firstly an active position in which the teeth 125, 126 of the slug engage with the teeth 113 of the moving cheek-plate (FIGS. 10, 11, and 14); and secondly a retracted position in which the slug 123, 124 does not co-operate with the teeth 113 of the moving cheek-plate (FIGS. 16 and 17).

The various guides for the blocking slugs 123, 124 are constituted by half-cutouts or stampings in the stationary cheek-plate 107. In particular, the blocking slug 124 placed between the two locking slugs 111 is guided between two of the stampings 114a that also serve to guide the locking slugs 111, while the other three blocking slugs 123, 124 are guided by the above-mentioned stampings 121a, which stampings 121a also define one of the two guides 114a for each of the locking slugs 111.

As in the first two embodiments of the invention, each blocking slug 123, 124 is normally in contact with a point zone 144 of each of its guides 114a, 121a.

Each of the blocking slugs 123, 124 has a shape that diverges radially outwards and therefore has two diverging side edges 127, 128 placed facing corresponding bearing edges 129, 130 formed by the guides 114a and 121a and diverging outwards.

As shown in FIGS. 10 and 11, the locking slug 123 is urged resiliently towards its active position, e.g. by means of a spring 131 such as a spring blade folded substantially into a U-shape, passing through a hole 132 formed in the slug 123 and penetrating into a recess 133 formed in the stationary cheek-plate 107.

In addition, the slug 123 has a peg 134 which projects axially towards the moving cheek-plate 108 and which penetrates into a cutout 135 formed in the control plate 118. This cutout 135 has an outer edge 136 in the form of a ramp which is adapted to cause the locking slug 123 to slide radially inwards when the cam 116 is in the actuation position, and an inner edge 134 in the form of a ramp which is adapted to bear against the peg 134 and hold the blocking slug 123 in the active position when the cam 116 is in the actuation position.

Furthermore, each blocking slug 124 is provided with a metal spring insert 138 (see FIGS. 14 and 15) which comprises firstly a bearing plate 139 covering the front portion of the blocking slug 124 and bearing against the teeth 113 of the moving cheek-plate 108, and secondly two resilient tabs 140 folded from the bearing plate 139 and penetrating into a housing 141 formed in the blocking slug 124. The resilient tabs 140 urge the blocking slug 124 resiliently towards its retracted position (FIGS. 16 and 17).

Figure 14:
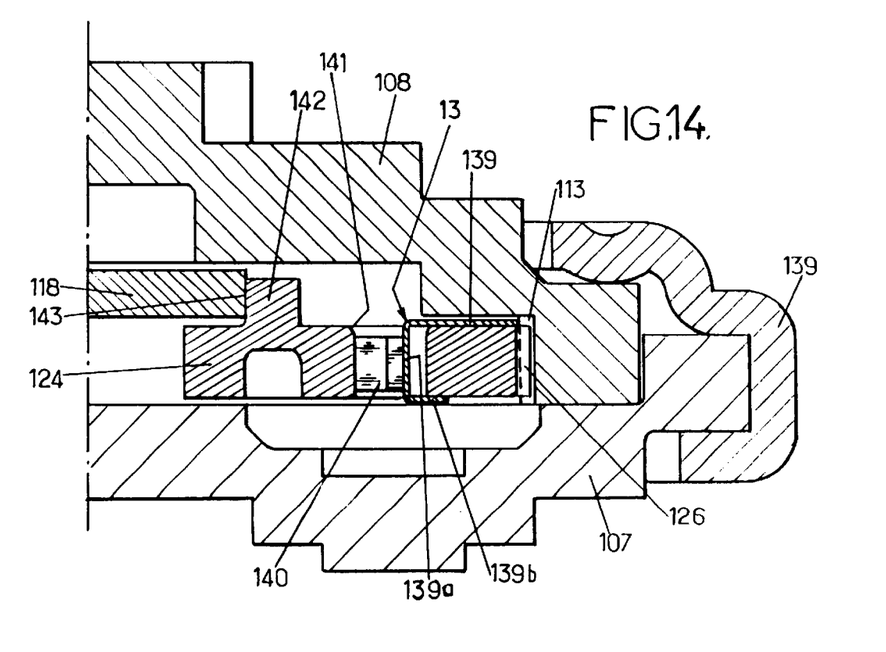
FIG. 14 is a detail view in section on line XIV—XIV of FIG. 11 through one of the blocking slugs of the mechanism of FIGS. 10 and 11.
Figure 15:
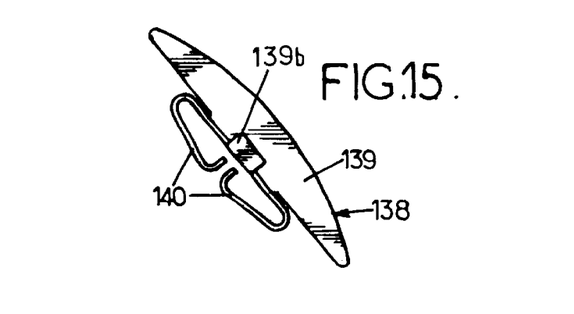
FIG. 15 is a view from beneath of a spring insert fitted to the blocking slug of FIG. 14.

Advantageously, the plate 139 of the spring insert is extended towards the stationary cheek-plate 107 by a lug 139a which penetrates into the hole 141 in the blocking slug 124. This lug 139a is itself extended radially outwards by a tab 139b which passes beneath the slug 124 and guarantees that the spring insert 138 is properly positioned relative to the slug 124.

Each blocking slug 124 also has a peg 142 which projects axially towards the moving cheek-plate 108, and the outer peripheral edge of the control plate 118 has bearing edges 143 adapted to bear against the pegs 142 so as to compress the resilient tabs 140 and displace the blocking slugs 124 into their active position when the cam 116 is in the actuation position (FIGS. 10, 11, and 14).

In normal use of the hinge mechanism 105, the blocking slugs 123 and 124 produce substantially no effect.

In contrast, when a particularly high pivot torque (e.g. greater than 100 m.daN) is applied between the stationary and moving cheek-plates 107 and 108, in particular due to the vehicle in which the seat is installed being subjected to a road traffic accident, the locking slugs 111 can deform their guides 114 slightly so that the moving cheek-plate 108 begins to pivot. As soon as this pivoting reaches a value that is sufficient to absorb the clearance that exists between the blocking slugs 123, 124 and their guides 114a, 121a (e.g. an angle of about 2°), said blocking slugs 123, 124 are pressed strongly against the teeth 113 of the moving cheek-plate by the wedging effect between one of the side edges 127, 128 of each slug and the corresponding bearing edge 129, 130. Given this wedging effect, the mechanical strength of the hinge 105 is likewise considerably increased.

Figure 18:
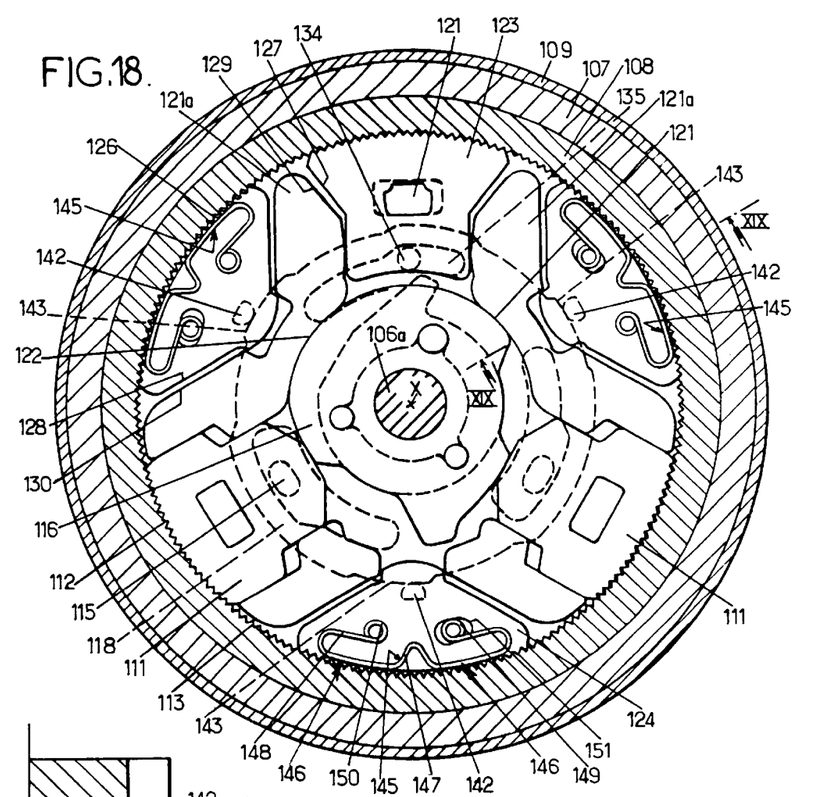
FIGS. 18 and 19 are similar respectively to FIGS. 11 and 14 and show a fourth embodiment of the invention.
Figure 19:
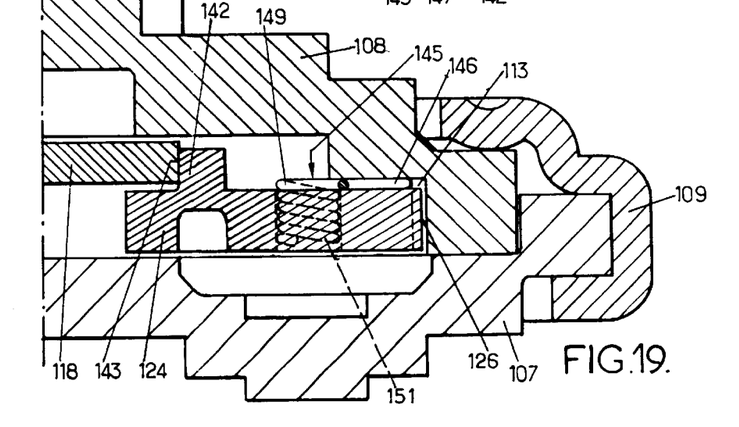

The fourth embodiment of the invention as shown in FIGS. 18 and 19 is very similar to the third embodiment of the invention, so it is not described in detail below.

This fourth embodiment of the invention differs from the third embodiment solely by the fact that the spring insert 138 of each blocking slug 124 is replaced by a wire spring 145 preferably in the form of two circularly-arcuate segments 146 placed to bear against the inwardly-directed teeth 113 of the moving cheek-plate, these two circularly-arcuate segments 146 being preferably interconnected by a V-shaped reentrant portion 147. The segments 146 of the spring wire 145 are extended by two resilient branches 148 folded towards each other in a hairpin shape and each extending to a rolled-up end 149. Each of the rolled-up ends 149 is constituted by a series of turns extending along a central axis parallel to the axis X and penetrating into a housing 150, 151 formed in the blocking slug 124 so that the spring wire 145 urges the blocking slug 124 towards its retracted position.

Advantageously, at least the housing 151 is of oblong shape in the circumferential direction, thus enabling the corresponding turn 149 to move in said circumferential direction so as to track the deformations of the V-shaped reentrant portion 147 of the spring wire 145.

We claim:

1. A hinge mechanism for a vehicle seat, the mechanism comprising:
    first and second rigid structures mounted to pivot relative to each other about a pivot axis;
    a set of teeth secured to the first structure and forming at least a circular arc centered on the pivot axis;
    at least one toothed locking member mounted on the second structure with substantially no play in a circumferential direction so long as the hinge mechanism is not subjected to a torque in excess of a certain normal value, the locking member being movable in a substantially radial direction between firstly an active position in which said locking member engages the teeth of the first structure to prevent the first and second structures moving relative to each other, and secondly a retracted position in which said locking member does not interfere with the teeth of the first structure; and
    a control device suitable for selectively placing the locking member either in the active position thereof or else in the retracted position thereof;
    wherein the mechanism further comprises at least one blocking member having teeth adapted to engage with the teeth of the first structure, said blocking member being mounted on the second structure in such a manner that the teeth of said blocking member leave a certain amount of clearance in the circumferential direction, the blocking member being movable between firstly an active position in which said blocking member engages the teeth of the first structure, and secondly a retracted position in which said blocking member does not interfere with the teeth of the first structure;
    wherein the control device is adapted simultaneously to place the blocking member and the locking member either in the active position or else in the retracted position; and
    wherein the second structure has a least one guide which is normally separated from the blocking member by said circumferential clearance, the guide being adapted to co-operate with a projecting side bearing edge belonging to the blocking member to press said blocking member by the wedge effect against the teeth of the first structure when the hinge mechanism is subjected to a torque which is greater than said normal value and which absorbs said circumferential clearance of the blocking member by moving the blocking member toward the guide of said blocking member.

2. A hinge mechanism according to claim 1, in which the second structure has two guides on either side of the blocking member and normally separated from the blocking member by said circumferential clearance, said guides being adapted to co-operate respectively with the two bearing edges belonging to the blocking member by pressing the blocking member by the wedge effect against the teeth of the first structure when the hinge mechanism is subjected to a torque that is greater than said normal value and that absorbs said circumferential clearance of the blocking member.

3. A hinge mechanism according to claim 2, in which the blocking member is mounted to slide in a substantially radial direction between the two guides of said blocking member, the guides having respective bearing zones substantially in point contact with the locking member, leaving said locking member with a certain amount of angular clearance, which angular clearance corresponds to said circumferential clearance of the teeth of the blocking member.

4. A hinge mechanism according to claim 1, in which the bearing edge of the blocking member co-operates with the teeth of said blocking member to form a wedge that projects sideways relative to said blocking member.

5. A hinge mechanism according to claim 1, in which the guide of the blocking member co-operates with the teeth of the first structure to define a wedge-shaped space which opens towards the corresponding bearing edge of the blocking member.

6. A hinge mechanism according to claim 1, in which the control device comprises:
    a rotary cam which is urged resiliently toward a rest position in which said cam places the locking member in the active position thereof; and
    at least one control plate which is secured to the cam and which overlies the locking member and the blocking member at least in part, said control plate having cutouts adapted to co-operate with projecting pegs formed on the locking member and on the blocking member so as to displace said locking member and said blocking member simultaneously toward the retracted positions thereof when the cam is moved into an actuation position.

7. A hinge mechanism according to claim 6, in which the cutout of the control plate has a camming edge which is adapted to hold the blocking member in the active position thereof when the cam is in the actuation position.

8. A hinge mechanism according to claim 1, in which the blocking member is urged toward the active position thereof by a spring connecting said blocking member to the second structure.

9. A hinge mechanism according to claim 1, in which the control device comprises:
    a rotary cam which is urged resiliently toward a rest position in which said cam places the locking member in the active position thereof; and
    at least one control plate which is secured to the cam and which overlies the locking member and the blocking member at least in part, said control plate having a cutout adapted to co-operate with a projecting peg provided on the locking member so as to move said locking member toward the retracted position thereof when the cam is moved into an actuation position, said control plate also having a camming edge adapted to co-operate with a projecting peg provided on the blocking member so as to move said blocking member into the active position thereof when the cam is moved into the actuation position, the blocking member being urged resiliently toward the retracted position thereof.

10. A hinge mechanism according to claim 9, in which the blocking member is urged resiliently toward the retracted position thereof by a resilient member which bears against the teeth of the first structure.

11. A hinge mechanism according to claim 10, in which the resilient member comprises a bearing plate in the form of a circular sector which bears against the teeth of the first structure, and at least one resilient tab secured to the bearing plate and engaged in a hole formed in the blocking member.

12. A hinge mechanism according to claim 10, in which the resilient member is a spring wire having at least one circularly-arcuate outer segment bearing against the teeth of the first structure, said circularly-arcuate segment being extended by at least one branch folded as a hairpin and terminated by an end which is engaged in a recess in the blocking member.

13. A hinge mechanism according to claim 12, in which the resilient member has two circularly-arcuate segments interconnected by a V-shaped reentrant portion, each of the circularly-arcuate segments being extended by a respective branch folded as a hairpin and terminated by turns wound about an axis parallel to the pivot axis and engaged in a recess formed in the blocking member, at least one of the windings being engaged with clearance in the corresponding recess.

14. A hinge mechanism according to claim 1, and comprising:

two diametrically-opposite locking members; and two blocking members that are likewise diametrically-opposite and that are disposed substantially at right angles relative to the two locking members.

15. A hinge mechanism according to claim 1, comprising a blocking member and two locking members disposed symmetrically relative to the blocking member, the blocking member forming an angle relative to each locking member where said angle lies in the range 100° to 170° about the pivot axis.

16. A hinge mechanism according to claim 15, in which the control device comprises a rotary cam which is resiliently urged towards a rest position in which said cam holds the locking members in the active position, the cam having first, second, and third bearing edges projecting radially outwards and distributed around the pivot axis, the first and second bearing edges of the cam being adapted to bear against the locking members when the cam is in the rest position, and the third bearing edge of the cam being disposed symmetrically relative to the first and second bearing edges and being adapted to bear radially against an abutment secured to the second structure when the cam is in the rest position, said abutment limiting the movement of the blocking member.

17. A vehicle seat comprising a seat proper and a seat-back connected together by at least one hinge mechanism according co claim 1.

* * * * *

UNITED STATES PATENT AND TRADEMARK OFFICE
CERTIFICATE OF CORRECTION

PATENT NO. : 6,561,585 B2
DATED : May 13, 2003
INVENTOR(S) : Cilliere et al.

Page 1 of 1

It is certified that error appears in the above-identified patent and that said Letters Patent is hereby corrected as shown below:

<u>Column 11,</u>
Line 55, please replace "a least one" with -- at least one --.
Line 55, please replace "a least one" with -- at least one --.

<u>Column 14,</u>
Line 25, please replace "according co claim 1" with -- according to claim 1 --.

Signed and Sealed this

Seventh Day of October, 2003

JAMES E. ROGAN
*Director of the United States Patent and Trademark Office*